US009106812B1

(12) United States Patent
Price et al.

(10) Patent No.: US 9,106,812 B1
(45) Date of Patent: Aug. 11, 2015

(54) AUTOMATED CREATION OF STORYBOARDS FROM SCREENPLAYS

(75) Inventors: Roy F. Price, Seattle, WA (US); Peter A. Schwabland, Seattle, WA (US); Joseph King, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 460 days.

(21) Appl. No.: 13/340,029

(22) Filed: Dec. 29, 2011

(51) Int. Cl.
*G06F 17/00* (2006.01)
*H04N 1/21* (2006.01)
*G06F 17/30* (2006.01)

(52) U.S. Cl.
CPC ............ *H04N 1/2129* (2013.01); *H04N 1/212* (2013.01); *G06F 17/30017* (2013.01); *G06F 17/30023* (2013.01); *G06F 17/30026* (2013.01)

(58) Field of Classification Search
CPC .................... G06F 17/30017; G06F 17/30026; G06F 17/3003; G06F 17/30023; H04N 1/212; H04N 1/2129; H04N 3/09895; H04N 3/167
USPC ......... 715/716, 200–204, 719–723, 731, 756, 715/732, 726, 209, 273
See application file for complete search history.

(56) References Cited

U.S. PATENT DOCUMENTS

| 2003/0171147 | A1* | 9/2003 | Sinclair et al. ................. 463/39 |
| 2008/0007567 | A1* | 1/2008 | Clatworthy et al. .......... 345/619 |
| 2008/0215984 | A1* | 9/2008 | Manico et al. ................ 715/730 |
| 2011/0080410 | A1* | 4/2011 | Lee et al. ...................... 345/473 |
| 2012/0196260 | A1* | 8/2012 | Nhiayi .......................... 434/317 |
| 2012/0311448 | A1* | 12/2012 | Achour et al. ............... 715/723 |

* cited by examiner

*Primary Examiner* — Quoc A Tran
(74) *Attorney, Agent, or Firm* — Lee & Hayes, PLLC (57) ABSTRACT

Computing resources may automatically generate a rough draft of storyboard by using textual analysis to extract meaning from a screenplay. The storyboard may be accompanied by spoken dialog, sound effects, and a soundtrack. Users may provide pre-production decisions regarding appearance of characters and backgrounds. The users may include a community of different individuals who contribute content and suggest modifications to the storyboard. The computing resources may also access logic to select visual elements for the storyboard from libraries of existing content or from custom content prepared by one of the users. Pagination of the screenplay and location of dialog and action on the pages of the screenplay may be used to create a timeline for the storyboard and any accompanying audio.

23 Claims, 7 Drawing Sheets

AUTOMATED CREATION OF STORYBOARDS FROM SCREENPLAYS

BACKGROUND

Movie production often begins with a script or screenplay. Movie studios evaluate screenplays and decide which screenplays will be made into movies. Screenplays frequently have only minimal descriptions of dialogue and actions and may require a reader to exercise significant creativity to imagine the screenplay as a finished movie. During the production of a movie, the screenplay may go through several versions such as a "shooting script" that provides technical direction such as camera behavior but is still difficult to visualize.

In order to assist in visualizing how the screenplay will look as a movie, basic illustrations of scenes from the script may be drawn and arranged into a storyboard. Generally this process is performed by drawing individual frames either by a hand or with a graphics program. The storyboard may be combined with a rough soundtrack and rough dialogue to give a better feel for how the final movie will look and sound. Directors, animators, and others involved in the production of a movie may work out screenplay, camera positioning, shot list, timing issues, and the like by editing the storyboard. In some instances, revisions to the storyboard may cause revisions to the script, while revisions once filming has begun may require additional storyboarding, and so forth until the movie is complete.

Effective storyboards help bring a screenplay to life and help identify issues earlier in the production process thus saving money and simplifying later stages of production.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes, in part, techniques for a computer application that analyzes a screenplay and generates an editable rough draft film in a timeline using at least a library of visual assets, sound effects, and/or a dialogue track. A screenplay or script is a written work that is made especially for a movie, a television program, a commercial, a music video, or other audio-visual content such as a segment of a computer game. A storyboard or an animatic may be a rough draft or an early version (e.g., before or during production) of the film. Storyboards are graphic organizers that show a series of illustrations or images displayed in sequence for the purpose of pre-visualizing some type of video media such as a movie, television show, commercial, animation, motion graphic, or interactive media sequence such as a website or computer game. Animatics are a type of storyboard that may add motion and sound to a basic storyboard to give a better idea of how an audio-visual work will look and feel with motion and timing. An animatic may include a rough dialogue and/or a rough sound track in addition to a sequence of still images to test whether the sound and images are working effectively together. Animatics may also include basic animation or moving elements and may show the effects of camera position by imitating filming techniques (e.g., simulating a camera zoom).

A storyboard or animatic may be created automatically from a script based on automatic analysis of the script. The analysis may leverage the formatting and style conventions of scripts to enhance automatic recognition of script elements and use text analytics to assign meanings to words in the script.

Figure 1:
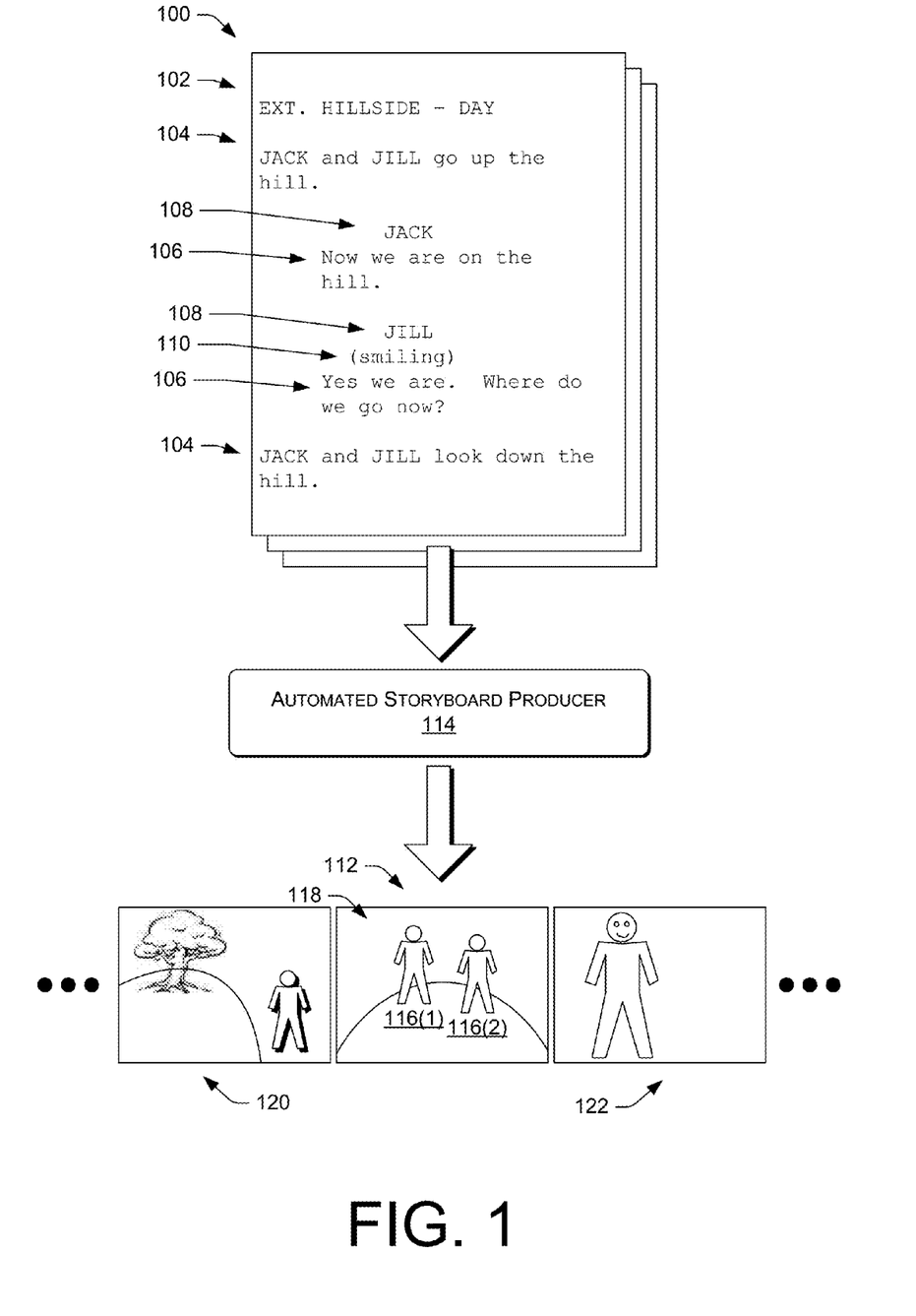
FIG. 1 shows conversion of a screenplay into a storyboard by an automated storyboard producer.

FIG. 1 shows an illustrative page from a screenplay 100. The format of the screenplay 100 and screenplays in general is highly structured according to standard rules. In the United States, screenplays are typically formatted for letter sized paper with 1.5 inch left margins, 1.0 inch right margins, 1.0 inch top margins, and bottom margins of 0.5 to 1.5 inches. The standard font for screenplays is 12 point, 10 pitch Courier. Screenplays are structured in a way that one page usually equates to about one minute of screen time.

The start of a scene in the screenplay 100 is indicated by a "slugline" 102 that describes numerous aspects of the scene. The slugline 102 is typically written in all capital letters and may comprise three parts. The first part, the first word of the slugline 102, may specify the scene setting as inside (interior) or outside (exterior) with the abbreviations INT and EXT, respectively. A period follows each abbreviation. Sometimes the action may move from interior to exterior several times within a scene. In the interest of brevity, the writer may choose to use INT./EXT. or EXTANT. The second part identifies the location of the scene (e.g., hillside). The third part refers to the time of the scene. Day or Night are normally used, but Dusk, Dawn, Late Night, Early Morning and others can be used if necessary.

The major components of a screenplay are descriptions of action 104 and dialogue 106. The "action" 104 is written in the present tense. Character names may be written in all capital letters when used for the first time in a description of action 104 (e.g., JACK and JILL).

The "dialogue" 106 is the lines that the characters speak. Sections of dialogue 106 are indented with approximately 3.0 inch left margins and 2.5 inch right margins. Sections of dialogue 106 begin with the speaking character's name 108 in all capital letters indented about 4.2 inches from the left side of the page.

Parentheticals 110 may be used to express emotion, the manner in which a character speaks his or her lines (e.g., smiling), or to indicate brief portions of action. The parentheticals 110 are indicated by enclosure within parentheses. The parentheticals 110 begin about 0.5 inches to the left of the character name 108.

The descriptions of scenes in the sluglines 102, the action 104, and the dialogue 106 provide a basis from which the screenplay 100 is used to create a storyboard 112 and ultimately a movie or other audiovisual work. Alternation between periods of the dialogue 106 and periods of the action 104 creates pauses in the dialogue. The relative timing of the dialogue 106 and the pauses may be estimated from the length of the corresponding passage on the page of the screenplay 100. For example, assuming one page of the screenplay 100 is equivalent to about one minute of screen time, a section of the action 104 that occupies ¼ of the page may be equivalent to about 15 seconds of screen time.

An automated storyboard producer 114 may use a series of rules, logic, artificial intelligence, and machine learning to generate the storyboard 112 from the screenplay 100. Generation of the storyboard 112 may be fully automated and created without human input or the automated storyboard producer 114 may incorporate selective human input and feedback when creating the storyboard 112. The storyboard 112, as described herein, may be a series of static images or may include various audio tracks and/or animation as found in an animatic. Conventional rules for structuring a screenplay 100 may be supplemented with additional formatting conventions to enhance automatic analysis by the automated storyboard producer 114. For example, bold text is not typically used in screenplays 100, but bold text may be understood by the automated storyboard producer 114 to represent camera techniques, so use of bold text may allow an author to provide camera techniques in a way that will be unambiguously interpreted by the automated storyboard producer 114. Other formatting and writing conventions besides bolding may also be applied to add additional "metadata" to the screenplay 100 for the automated storyboard producer 114.

One frame of the storyboard 112 may include character images 116(1) and 116(2), collectively 116, for each of the characters mentioned in the corresponding scene from the screenplay 100. Here, the character image 116(1) may represent the character Jill and the character image 116(2) may represent the character Jack. Analysis of character names and any character descriptions provided in the screenplay 100 may be used to select the character images 116. For example, a female image may be selected for Jill and a male image may be selected for Jack based on, for example, comparing the names with a database that includes names associated with gender. The character images 116 may be placed in front of a background 118. The background 118 may be selected based on analysis of the slugline 102, the action 104, and/or the dialogue 106 from the screenplay 100. Here, the background 118 is shown as a hill. The background 118 may be a still image or may have animation.

The finished draft of the storyboard 112 may include multiple frames. In some implementations one frame may be generated by the automated storyboard producer 114 for each slugline 102. In other implementations, more than one frame may be generated for a given scene, for example, when multiple frames are used to suggest camera movement. Here, the scene on the hill is preceded by an earlier scene 120 that corresponds to an earlier portion of the screenplay 100 and followed by a later scene 122 that corresponds to a later portion of the screenplay 100.

Illustrative Architecture

Figure 2A:
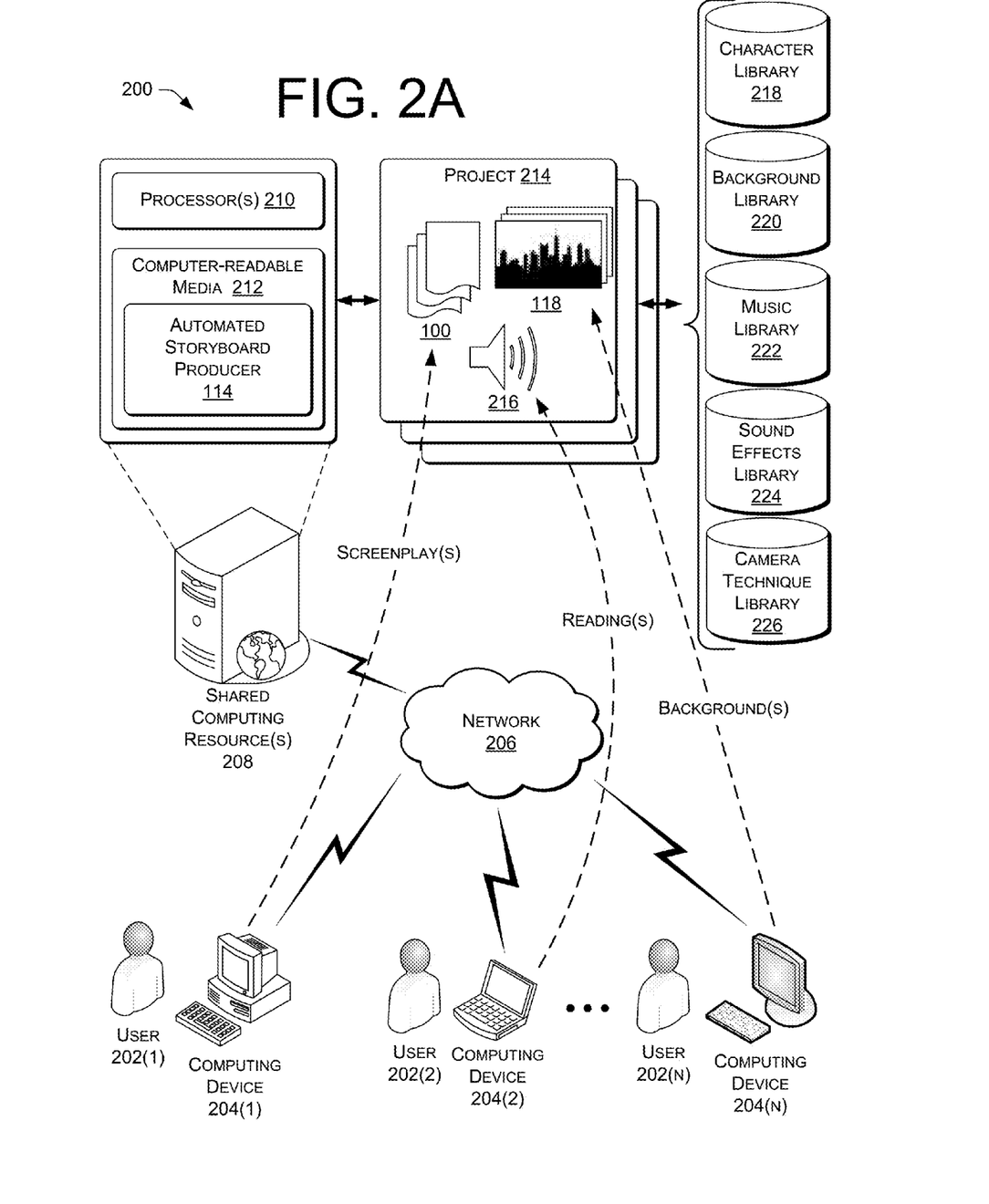
FIGS. 2A and 2B illustrate an example architecture that shows users and resources for assembling content, generating a storyboard from a screenplay, editing the storyboard, and viewing the storyboard.

FIG. 2 is a diagram of an illustrative architecture 200 showing users 202(1), 202(2), . . . , 202(n), collectively 202, interacting with respective computing devices 204(1), 204(2), . . . , 204(n), collectively 204, that may generate and contribute content to be used in the creation of the storyboard 112. The computing devices 204 may be implemented as desktop computers, laptop computers, netbooks, personal digital assistants (PDA), smart phones, personal media players, set top boxes, game consoles, or other electronic computing devices. The computing devices 204 may contain software and hardware typically found in conventional computing devices.

The computing devices 204 may communicate via a network 206 with one or more shared computing resources 208. The network 206 represents any type of communications network such as the Internet, a wide area network (WAN), a local area network (LAN), a telephone network, a cable network, a mesh network, a peer-to-peer network, and the like. The shared computing resources 208 may include one or more server computers (e.g., from a single on premises server to a remote server farm), supercomputers, mainframes, computers connected in a peer-to-peer or mesh network, combinations thereof, or other computing resources that may be shared through the network 206. The shared computing resources 208 comprise one or more processors 210 and one or more forms of computer-readable media 212. In some implementations, the computer-readable media 212 may be implemented in hardware or firmware. The computer-readable media 212 may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer-readable medium which can be used to store information and which can be accessed by a processor. The computer-readable media 212 may also contain an operating system for controlling software modules stored in the computer-readable media 212 and for controlling hardware associated with the shared computing resources 208. Although one illustrative implementation of the automated storyboard producer 114 is as a network-based system discussed above, it is also possible for the automated storyboard producer 114 to be implemented as a local application running on one of the computing devices 204.

The automated storyboard producer 114 may be stored in the computer-readable media 212 at a single location, redundantly in multiple locations, or in a distributed storage format in which parts of the automated storage board producer 114 are stored in separate physical memory units. The automated storyboard producer 114 may manage one or more projects 214 that each contains content which may be used to create storyboards for the respective projects. The project 214 may be stored in the computer-readable media 212 or otherwise accessible by the shared computing resources 208. Contents of the project 214 may be freely available to the users 202 for viewing and/or editing. In some implementations, any user 202 with access to the network 206 may interact with the project 214. In other implementations, access to view and/or edit the project 214 may be limited to only certain users 202 such as, for example, users 202 that have received permission from an author of the screenplay 100 contributed to the project 214.

The project 214 may begin with a single screenplay 100. The screenplay 100 may be provided as a text document in a computer readable format or as an image of a scanned document that is converted into computer readable format through optical character recognition. The user 202(1) that contributed the screenplay 100 as well as other users 202(2)-202(n) may edit the screenplay 100 making multiple versions and revisions.

The same user 202(1) that contributed the screenplay 100 or another user (e.g., 202(2)) may contribute a reading of dialogue 216 from the screenplay 100. A single user 202 may read dialogue passages for several characters, for example, by using different voices for each character. Different users 202, such as professional actors or voice talents, may each separately read lines of dialogue for individual characters. Audio files containing recordings of various readings of dialogue 216 may be tagged with an indication of the character and specific lines with which the reading corresponds. The tagging may be performed by the user 202 that creates the recording or it may be performed automatically, for example, by speech-to-text analysis of the recording and matching with the corresponding text from the screenplay 100.

The same or different user 202 that provided the screenplay 100 and/or the reading of dialogue 216 may also contribute a background image 118. The background image 118 may be any type of image file. The background image 118 may represent the interpretation that the user 202(n) has of a scene location from a slugline 102 in the screenplay 100.

The reading of the dialogue 216 and the background image 118 represent custom content developed by users 202 for the project 214. The custom content is based on the users' 202 interpretations of the screenplay 100. Other types of custom content such as sound effects, soundtrack music, and the like may also be contributed to the project 214. The collaborative environment created by the project 214 being available through the network 206 may allow different users 202(1)-202(n) to contribute in areas of their respective strengths. For example, an actor could read lines from many different screenplays 100 in many different projects 214. Similarly, an artist may contribute background images 118 to multiple projects 214. Thus, addition of a screenplay 100 to a project 214 may enable the author of the screenplay 100 (e.g., user 202(1)) to collaborate with other users 202(2)-202(n) via the network 206 to create a better storyboard 112 than he or she could create independently. Additionally, other users 202 that wish to work on the creation of storyboards without writing their own screenplay 100 (e.g., actors, artists, musicians, etc.) may find a variety of projects 214 to which they may contribute.

However, some projects 214 may not include sufficient custom content to create a finished storyboard 112 entirely from custom content. The automated storyboard producer 114 may also access various libraries of existing content for inclusion in a storyboard 112. The libraries may include but are not limited to a character image library 218, a background image library 220, a music library 222, a sound effects library 224, and a camera technique library 226. The libraries of electronic content may be data stores connected to the network 206 or accessible via a connection to the shared computing resources 208. The libraries may also be stored in whole or in part in the computer-readable media 212.

The character image library 218 may include multiple character images such as the character images 116 shown in FIG. 1. Character images in the character image library 218 may be categorized by gender, hair color, skin color, eye color, body type, nationality, clothing, occupation, historical era, or any other aspect of physical appearance. Thus, if the automated storyboard producer 114 interprets a screenplay 100 to call for a female secretary from 1980's America, the character image library 218 may provide one or more character images that are categorized as having some or all of those features.

The character image library 218 may also include facial expressions that represent visible facial behavior. Facial expressions may be combined with character images to create different combinations of overall appearance with particular facial appearances. The facial expressions of a character as applied to the character image may change with each scene, but the base character image may remain the same. In some implementations, the facial expressions may be stored as a series of particular facial characteristics that can be applied to a generic face associated with a character image. For example, expression to "smile" may be associated with raising the corners of the mouth. This expression may be applied to the face of a character image to convert or "morph" that face into the "smiling" expression. A face of a character image that is displaying one expression may also be switched to display another, different, expression.

One illustrative technique for representing visible facial behavior is the Facial Action Coding System (FACS). FACS is an anatomically-based system that identifies forty four possible independent movements of the facial musculature called action units (AUs). The AUs are able to represent the entire range of all possible movements that can occur in human face. This identification is based on functional, not structural, anatomy, organizing muscles or muscle combinations into AUs depending on how they function. Emotion FACS (EMFACS), identifies those AUs that are theoretically or empirically related to emotion. For example, the emotion "happy" may suggest the facial behavior of "smiling" and the particular AUs associated with smiling.

The character image library 218 may also include movement elements for animating all or part of a character image. The movements may include multiple walk cycles that are selected based on a description of action 104 (e.g., "run" is associated with a faster walk cycle than "stroll"). The movements may also include other typical character movements found in movies such as look left, look right, look up, look down, raise left arm, raise right arm, sit, stand, etc.

The background library 220 may include multiple backgrounds 118 that represent different scenes which may be used in movies, television shows, or other types of audiovisual works. The background library 220 may also include background elements that can be combined into a single background 118. For example, the background library 220 may include an image of a hillside and may include multiple images of trees. If the automated storyboard producer 114 interprets a screenplay 116 as including a scene with a background of a hillside (e.g., as shown in FIG. 1), the background library 220 may provide an image of a hillside and another image of trees that can be combined to create a background image for use in a storyboard 112. Various backgrounds 118 and background elements available in the background library 220 may be characterized, tagged, or otherwise identified as to be amenable to automatic searching.

The music library 222 may include songs that can be used to create a soundtrack for the storyboard 112. The songs available in the music library 222 may be grouped by song genre (e.g., rock 'n roll, blues, etc.), corresponding movie genre (e.g., Western, film noir, etc.), instruments used, vocals, date of creation, key, and the like.

The sound effects library 224 may include multiple sound effects such as the sound of footsteps, the sound of a creaky door, a gunshot, etc. Sound effects may be selected by the automated storyboard producer 114 based on analysis of action 104 described in the screenplay 100. For example, if a description of action 104 in the screenplay 100 indicates that Jack walks across the hillside, the automated storyboard producer 114 may correlate the action of walking with a sound effect for footsteps and include that sound effect in an audio track accompanying the storyboard 112. Depending on the size and variety of the sound effects library 224 there may be multiple sound effects that are potentially suitable for a given action. The automated storyboard producer 114 may engage in deeper analysis of the screenplay 100 to identify which of the multiple sound effects is most suitable. For example, if the character Jack is identified as a man, a sound effect of a woman walking in high heels may be excluded from the possible sound effects to represent Jack walking across the hillside.

The camera technique library 226 may include a variety of camera techniques such as zooms and pans. The camera techniques may be applied to the storyboard 112 by generating a series of still frames that suggest the visual change that will be created by the camera technique. If the storyboard 112 shows movement (e.g., an animatic), the camera techniques may be represented by the motion shown in the storyboard 112. The camera technique library 226 may include multiple templates for a given type of camera technique. For example, there may be many camera techniques for transitions between scenes. The templates may be organized by director, genre, or other category. For example, there may be a template that includes camera techniques which are suggestive of a television "soap opera" or a movie directed by Woody Allen.

In instances in which a character image, background image, etc. is identified that is not available either as custom content or in one of the libraries, the automated storyboard producer 114 may search other sources of digital content such as the network 206.

Figure 2B:
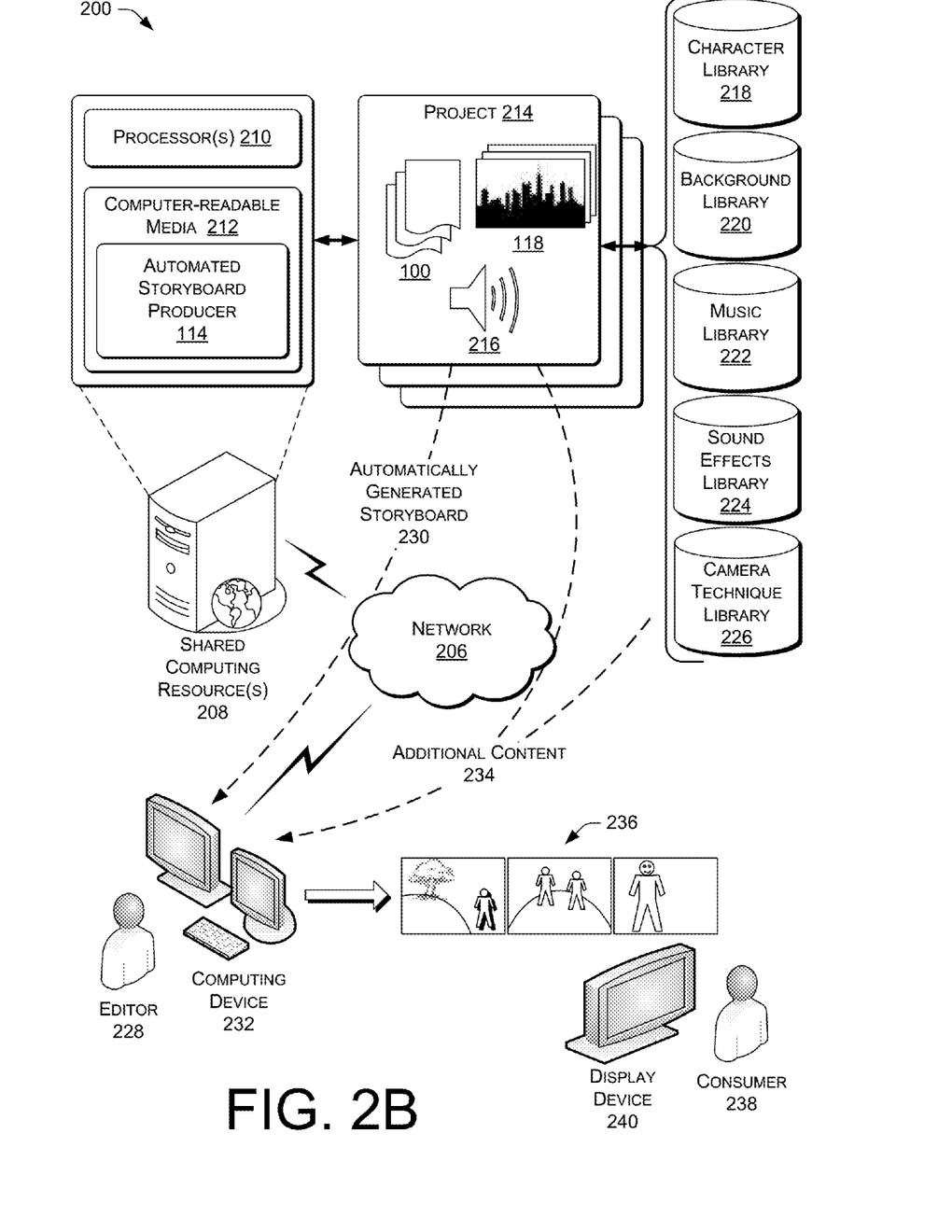

FIG. 2B shows an editor 228 receiving an automatically generated storyboard 230 that was generated by the automated storyboard producer 114. The automatically generated storyboard 230 may be viewed on or provided to a computing device 232 via the network 206. The editor 228 may choose to modify the automatically generated storyboard 230 by making additions, deletions, or altering content selected by the automated storyboard producer 114. For example, the editor 228 may selected additional content 234 (e.g., either custom content from the project 214 or content from one of the libraries 218-226) to supplement or replace content in the automatically generated storyboard 230.

Modifications by the editor 228 may result in a modified storyboard 236. Editing the automatically generated storyboard 230 may be a much faster process than creating a storyboard from scratch, so the editor 228 may be able save a significant amount of time by starting with the automatically generated storyboard 230. The modified storyboard 236 may be consumed by a consumer 238 using a display device 240 that may show the modified storyboard 236 and possibly reproduce audio associated with the modified storyboard 236. The modified storyboard 236 may also be printed and consumed in hard copy by the consumer 238. By way of example, the consumer 238 may be a producer, a director, another individual associated with turning the screenplay 100 into finished video media (e.g., a movie), a member of a test audience, etc.

Illustrative Automated Storyboard Producer

Figure 3:
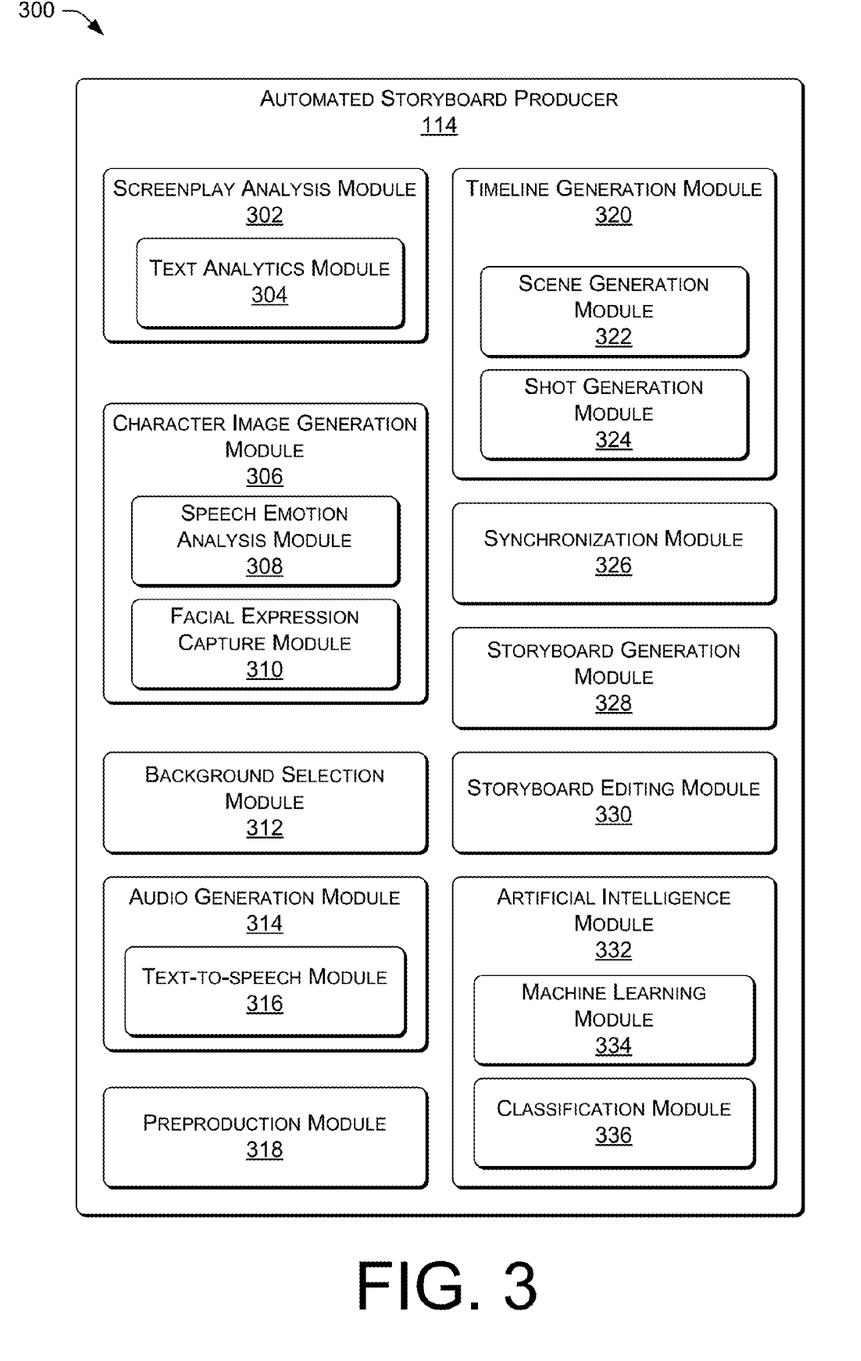
FIG. 3 is a block diagram showing components of the automated storyboard producer of FIG. 1 in greater detail.

FIG. 3 is a schematic representation 300 of components and modules that may be present in the automated storyboard producer 114. A screenplay analysis module 302 may analyze a screenplay 100 to extract information both from the content of the text and the layout and formatting of the text. The screenplay analysis module 302 identifies sections of dialogue 106, sections of the action 104, and relative locations of the sections of dialogue and the sections of action on the pages of the screenplay 100. The screenplay analysis module 302 may apply rules based on formatting conventions of screenplays. For example, single words in all capital letters may be identified as a character name 108, a sound effect, etc. An entire line in all capital letters may be identified as a slugline 102. Layout on page such as distance from the left margin may be used to distinguish lines identifying character dialogue 106, action 104, sluglines 102, parentheticals 110, and the like.

The screenplay analysis module 302 may include a text analytics module 304. The text analytics module 304 may include a set of linguistic, statistical, and machine learning techniques that model and structure the information content of textual content from the screenplay 100. Textual analysis may be applied to any portion of the screenplay 100 including dialogue 106, action 104, sluglines 102, etc. Specific textual analysis techniques may include lexical analysis to study word frequency distributions, pattern recognition, tagging/annotation, information extraction, data mining techniques, visualization, and predictive analytics. The text analytics module 304 may turn text into data for analysis via application of natural language processing (NLP) and/or other analytical methods.

Analysis performed by the text analytics module 304 may also include sentiment analysis. Sentiment Analysis involves discerning subjective (as opposed to factual) material and extracting various forms of attitudinal information: sentiment, opinion, mood, and emotion. Text analytics techniques analyze sentiment at the entity (e.g. a character), concept, or topic level and distinguishing opinion holder and opinion object (e.g., Jill likes standing on the hill because she is smiling). Automated sentiment analysis of the screenplay may use elements from machine learning such as latent semantic analysis, support vector machines, "bag of words," and semantic knowledge. To mine the opinion in context and get the feature which has been opined, the grammatical relationships of words may be used. Grammatical dependency relations may be obtained by deep parsing of the text.

The screenplay analysis module 302 may also perform disambiguation to choose between multiple possible interpretations of an analytical result based on contextual clues. For example, ambiguity as to whether a portion of text in all capital letters is a slugline 102 or the name of a character 108 may be disambiguated by considering the depth of indentation from the left margin. Similarly, contextual clues from the meaning of the words may be used to decide, for example, whether "Ford" refers to a brand of vehicle, a U.S. president, a movie star, or something else.

A character image generation module 306 may use textual analysis of a description of the character and of dialogue to select a character image. The character image may be selected from a custom character image created specifically for the screenplay 100. In some implementations, the character image generation module 306 may preferentially select custom character images if available. Character images may also be selected from the character image library 218. A character image may be selected based on a gender associated with the character's name, descriptions of the character in a slugline 102 and textual analysis of sections of dialogue associated with the character, etc. The character image generation module 306 may also create a cast list of all the characters used in the screenplay 100. In some implementations, multiple character images may be selected or recommended for each character in the cast list and the list together with automatically generated recommendations may be presented to a user 202. For example, during a preproduction stage, the user 202 may be able to confirm or modify automatic choices made by the character image generation module 306.

The character image generation module 306 may include a speech emotion analysis module 308. This speech emotion analysis module 308 may analyze an audio file of a person reading lines of dialogue 216. The way in which the dialogue 104 is read may have emotional content that can be analyzed to inform the selection of facial expressions for the character image. Speech emotion analysis may be performed by segmenting a speech sample into voiced and unvoiced sounds, words, and syllables to allow a quantitative description of relatively homogenous parts of the utterance. Then various voice cues of relevance to speech emotion including fundamental frequency, speech rate, pauses, voice intensity, voice onset time, jitter (pitch perturbations), shimmer (loudness perturbations), voice breaks, pitch jumps, and measures of voice quality (e.g., the relative extent of high- versus low-frequency energy in the spectrum, the frequency and bandwidth of energy peaks in the spectrum due to natural resonances of the vocal tract called formants) may be extracted and analyzed by the speech and motion analysis module 308.

Facial expressions for character images may also be determined by a facial expression capture module 310. The facial expression capture module 310 may capture the image of a face made by a user 202 and identify a facial expression for a character image based on the captured facial image. For example, one of the users 202 may make a facial expression (e.g., grimace) and record that expression with a webcam attached to his or her computing device 204. The expression captured by the camera may be analyzed and abstracted to a description of the expression which is then used to search for a facial image for example in the character library 218. Thus, if a user does not know the words to describe a particular facial expression, he or she may make the expression in front of a camera and use an image of the expression itself rather than keywords to search for the facial expression. Alternatively, the facial expression captured by the camera may be morphed on to a face of the character image allowing any type of facial expression to be generated even if there is not a match in a facial expression library or in the network 206.

A background selection module 312 may choose an appropriate background image 118 for the storyboard 112. The choice of a background image 118 may be based on textual analysis of the slugline 102. If a custom background image 118 has been provided for the screenplay 100 that matches the background of a particular scene, the custom background image 118 may be selected preferentially over other sources of background images (e.g., the background image library 220). If the background selection module 312 accesses the background image library 220 for a background image 114 there may be multiple images that are all potential choices for the background image 114. For example, the background image library 220 may include multiple images of hills, mountains, sloped ground, and the like. In one implementation, one of the matching images is selected randomly. In another implementation, past behavior of users 202 interacting with the shared computing resources 208 may be analyzed to identify the most frequently selected background image for a hillside and that image may be used as the background 118. Alternatively, rather than basing the selection on global popularity across all users of the automated storyboard producer 114, the selection of a background image 118 may be based on an individual user's past choices. For example, a user 202(1) that provided a screenplay 100 may have used the automated storyboard producer 114 multiple times in the past with other screenplays 100 having similar scene descriptions (e.g., hillside, hill, knoll, mound, etc.) and the previous selections by the user 202(1) may indicate which hillside image from the background image library 220 he or she picks most often.

An audio generation module 314 may create and assemble dialogue audio, soundtrack, and sound effects for the storyboard 112. The storyboard 112 may be accompanied by one or more audio tracks such as separate audio tracks for the dialogue of each character, a soundtrack of music, and sound effects. Each of the separate audio tracks may include pauses of appropriate lengths so that when combined together in a finished storyboard 112 the respective audio tracks are synchronized with each other and with the visual images. In other implementations, all types of audio information may be combined into a single soundtrack.

A text-to-speech module 316 may create a computer-generated voice that reads passages of dialogue from the screenplay 100. Synthesized speech can be created by concatenating pieces of recorded speech that are stored in a library (e.g., voice samples of a famous actor drawn from dialogue in movies) or alternatively, a synthesizer can incorporate a model of the vocal tract and other human voice characteristics to create a completely "synthetic" voice output. Synthetic speech may be used if, for example, users 202 have not contributed custom content of readings of dialogue 216.

If the storyboard 112 is created without any audio for dialogue, the dialogue may be shown as text bubbles in the storyboard 112 like a comic book. In some implementations, a first version of the storyboard 112 may include the text in text bubbles so that users providing readings of dialogue may do so while viewing the images in the storyboard 112 rather than reading straight from the screenplay 100.

A soundtrack for the storyboard 112 may be selected manually by a user 202 either as a preproduction step or as an editing step. The soundtrack may also be determined automatically by the audio generation module 314 based upon a genre of the screenplay 100, descriptions of scenes in the screenplay 100, or other factors. Music for the soundtrack may be selected from the music library 222.

Sound effects may be identified in the script by words and all capital letters (e.g., BANG). Semantic analysis and disambiguation may be used to determine if a word in all capital letters is a sound effect, a character's name, or something else. Sound effects may be provided as custom content for a particular script 100. The audio generation module 314 may also select sound effects from the sound effects library 224.

A preproduction module 318 may receive input from a user 202 about how to create the storyboard 112 in addition to the instructions provided by the screenplay 100 itself. In some implementations, the preproduction module 318 may receive input from the user 202 prior to analyzing the screenplay 100. Alternatively, the screenplay 100 may be analyzed (e.g., by the screenplay analysis module 302) before receiving preproduction instructions.

The preproduction module 318 may receive an indication of a genre for the screenplay 100 that is used by the automated storyboard producer 114 to select elements of the storyboard 112 (e.g., a soundtrack). If preproduction instructions are received after an initial analysis of the screenplay 100, the user may be presented with several suggested choices for various elements of the screenplay 100 (e.g., five choices for a character image 116, two choices for a background 118, etc.) and choose between the suggestions. The preproduction module 318 may also allow the user to designate timing of scene and shot transitions. The preproduction module 318 may also present a series of questions to the user designed to narrow down multiple possibilities. For example, a user may be asked about a character's gender, race, body type, clothing style, and the like to identify one or more choices from the character image library 218. As an alternative to providing a series of guided questions, the preproduction module 318 may also present the user with the option of freely searching through custom content, content libraries 218-226, and/or other sources to pick images, music, etc. for the storyboard 112. Although the preproduction module 318 may allow user input at the beginning to improve the storyboard 112 generated by the automated storyboard producer 114, the automated storyboard producer 114 may also function in a fully automatic mode and generate a storyboard 112 from a screenplay 100 without any human input during the process.

A timeline generation module 320 generates a timeline for the storyboard 112 by dividing the screenplay 100 into multiple scenes. The timeline may begin at time zero with the first page of the screenplay 100 and continue for approximately the same number of minutes as the number of pages in the screenplay 100. For example, a 118-page screenplay 100 would be spread across a two-hour timeline.

A scene generation module 322 may divide the timeline into multiple scenes. Each scene may be designated by a slugline 102. Thus, the timeline may divide the timeline into scenes based on the sluglines 102 in the screenplay 100. The length of a scene may be based on the number of pages and/or partial pages between the start and the end of the scene.

A shot generation module 324 in the timeline generation module 320 may subdivide individual scenes into shots. Each shot may represent different camera behavior during a scene. For example, one shot may be a zoom onto a character's face and the remainder of the scene may be shots alternating between that character's face and another character's face. Shots may be explicitly indicated in the screenplay 100, for example, if the screenplay 100 is a shooting script. Alternatively, shots may be inferred by the shot generation module 324 based on analysis of sluglines 102, action 104, and/or dialogue 106, in the screenplay 100. For example, a long sequence of dialogue 106 may imply a specific camera technique: staring with a wide shot on the characters speaking then zooming in on the character's faces and shifting back and forth between the faces as the characters alternate speaking Examples of camera shots that may be applied to the screenplay 100 can be accessed from the camera technique library 226. Use of the shot generation module 324 may turned on or off by a user 202 so that versions of the storyboard 112 may be produced both with and without automatic camera shots.

A synchronization module 326 may align parts of the storyboard 112 so that the timing is correct. For example, background images 118 may be changed based on the time points associated with different scenes as identified by the scene generation module 322. Additionally, the synchronization module 326 may map audio corresponding to the sections of dialogue 106 to the timeline based on the relative locations of the sections of dialogue 106 and the sections of action 104 on the pages of the screenplay 100. Periods of silence between sections of dialogue 106 may be determined by the length of intervening sections of action 104. The synchronization module 326 may also align scene and shot changes with the timeline.

A storyboard generation module 328 may combine visual elements such as the character images 116 and the background 118 to create a frame of the storyboard 112 according to the timeline created by the timeline generation module 320. The storyboard generation module 328 may place the character images 116 as well as props or other foreground images in front of the background 118. Location of various foreground elements relative to the background 118 may be based on analysis of the screenplay 100 such as analysis of descriptions contained within sluglines 102 and actions 104. In the absence of specific instructions for element placement, the storyboard generation module 328 may place character images 116 as well as other foreground features in default positions in front of the background 118. A default position may be the center of the background 118, the bottom third of the background 118, or another location depending on the particular background image 118. The storyboard generation module 328 may also order the images or frames that make up the storyboard 112 so that there is a sequence of storyboard images corresponding to the sequence of dialogue 106 and actions 104 in the screenplay 100.

A storyboard editing module 330 may allow a user 202 to interact with and modify a storyboard 112. The storyboard 112 may be presented in a user interface that includes tools and interface elements for video editing. During editing the user 202 may change any aspect of the storyboard 112. For example, if the user 202 does not like the background 118 selected by the background selection module 312, he or she may search through the background library 222 and select a different background for the scene. Editing may also include applying camera techniques to the storyboard 112. For example, the user may indicate a point on the timeline that represents a shot change and select a camera technique from a list of templates. Changes made by the user 202 to automatic selections of the automated storyboard producer 114 may provide feedback that allows the automated storyboard producer 114 to make better choices in the future.

The storyboard editing module 330 may also accommodate multiple simultaneous edits from multiple users 202. For example, one user may make changes to the soundtrack of a storyboard 112 while another user modifies facial expressions of the characters. In some implementations, simultaneous editing may be facilitated by allowing users 202 to "checkout" individual scenes or individual shots from the storyboard 112. Thus, two different users 202 could each simultaneously edit separate scenes. Changes made by the user 202 during editing may modify content selected by the automated storyboard producer 114 and/or content selected by the same or a different user 202. Various edits to the storyboard 112 may be saved and tracked in association with the user 202 who made the edits. Thus, if one of the users 202 does not like edits either made by himself or by the other user 202 those edits may be removed and the storyboard 112 may be reverted to an earlier version. Similarly, if different users or groups of users have divergent creative visions, there may be multiple versions of the storyboard 112 existing simultaneously (e.g., both as part of the project 214). At some point the different versions of the storyboard 112 may be presented to a third party and the third party may select the version to make into a movie, television show, etc.

An artificial intelligence module 332 may interact with any of the other modules in the automated storyboard producer 114 to implement analysis and/or decision-making operations. The artificial intelligence module 322 may use any type of artificial intelligence technology or algorithms. For example, support vector machines (SVMs) may implement supervised learning methods for classification and regression. Training examples, each marked as belonging to one of two categories, may be provided to an SVM training algorithm that builds a model which predicts whether a new example falls into one category or the other. The artificial intelligence module 332 may identify which known element (e.g., content in one of the libraries) is most similar to an unknown element (e.g., a word from the screenplay 100). The identification may provide the basis for selection of content for inclusion in the storyboard 100, for example, by the character image generation module 306, the background selection module 312, or the like.

An additional illustrative artificial intelligence technique is a Bayesian network, also called a belief network or a directed acyclic graphical model that is a probabilistic graphical model which represents a set of random variables and conditional dependencies via a directed acyclic graph (DAG). For example, a Bayesian network could represent the probabilistic relationships between character description and a character image 116. Given the description, the network can be used to compute the probabilities that a user 202 will select a different character image 116 to represent that character. This decision making may include inferential learning from past user choices.

The artificial intelligence module 332 may include a machine learning module 334. The machine learning module 334 may include algorithms that allow the automated storyboard producer 114 to learn via inductive inference based on observation data that represent incomplete information about statistical phenomena. Classification, which is also referred to as pattern recognition, allows machines to "learn" to automatically recognize complex patterns, to distinguish between exemplars based on their different patterns, and to make intelligent decisions. For example, influence diagrams which are generalizations of Bayesian networks that can represent and solve decision problems under uncertainty may be used as a component of machine learning.

The machine learning may be based on feedback received from users 202 either as part of preproduction or as editing. A change to automatic selections by the automated storyboard producer 114 may inform the machine learning module 334 that an incorrect classification or decision was made and the manual selection by the user 202 may be taken as the correct choice. The learning may be specific to an individual user (e.g., learn the type of background that user picks to represent a "cityscape") or based on aggregate choices of a larger population of users (e.g., learn the faces that people in general select to represent a grimace compared to a scowl). Thus, the machine learning module 334 may iteratively tune or refine operation of the automated storyboard producer 114 to individual users' preferences and choices made by human users in general.

The artificial intelligence module 332 may also be trained by exposure to sets of training data. For example, multiple finished movies together with the accompanying screenplays may be provided to the artificial intelligence module 332 to train algorithms for selecting and generating storyboards from screenplays. In some cases, the accompanying screenplays may include additional markup to reduce ambiguity of interpretations by the artificial intelligence module 332, and thus, improve the training value of those screenplays. Thus, rather than manually programming specific algorithms into the artificial intelligence module 332, the artificial intelligence module 332 may be allowed to learn and create its own algorithms by inferences derived by comparing movies to the corresponding screenplays. The movie and script combinations selected to serve as the training data may be selected manually. Alternatively the movies (and associated scripts) may be selected automatically based on a metric such as viewer ratings, box office sales value, volume of sales of video disks, number of downloaded copies, number of times the movie was streamed, or the like. Similar training may be used for other aspects of storyboard 112 design such as facial expressions. Sets of images showing facial expressions accompanied by explicit tags or identifiers for those facial expressions may be found on the Internet, a photograph archive, or other source and used to provide the artificial intelligence module 332 with reference points to distinguish between different facial expressions.

A classification module 336 in the artificial intelligence module 332 may classify unknown content into a category. For example, the classification module 336 may use SVMs to determine whether a song for soundtrack is "spooky" or "cheerful." The classification module 336 may also classify portions of the screenplay 100 as, for example, dialogue 106 or actions 104. When a choice is made by the automated storyboard producer 114, such as choosing a character image 116, the classification module 336 may assist in the decision-making by identifying which character image 116 in the character image library 220 is classified as being most similar to the description of the character as understood by the screenplay analysis module 302.

The automated storyboard producer 114 may also include additional modules other than those described herein and any of the individual modules described herein may be combined with other modules or split into separate modules.

Illustrative Processes

These processes discussed below are each illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
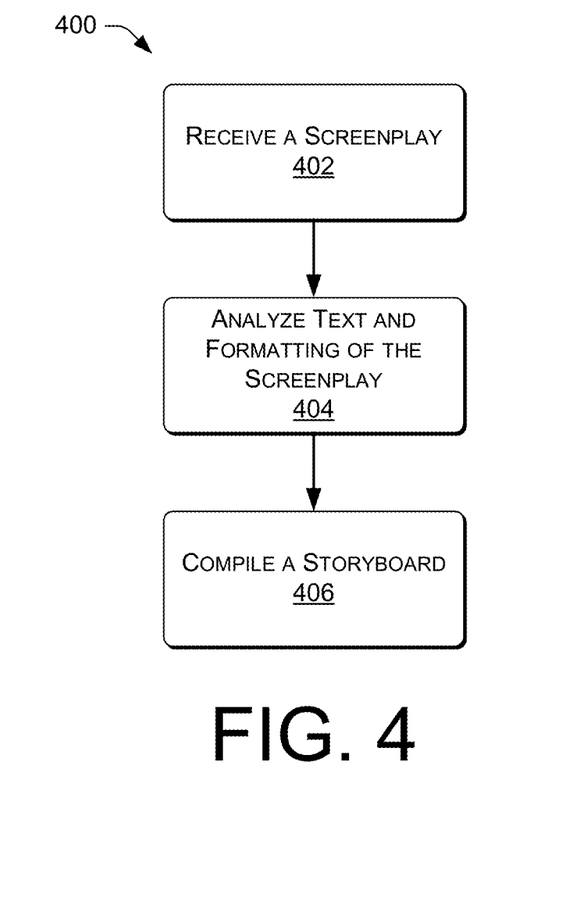
FIGS. 4-6 are flow diagrams of illustrative processes for generating a storyboard from a screenplay.

FIG. 4 illustrates a process 400 for generating a storyboard 112 from a screenplay 100. At 402, a screenplay 100 is received. The screenplay 100 may be received by the automated storyboard producer 114 in the shared computing resources 208. The screenplay 100 may include text that describes sections of dialogue 106 and sections of action 104. Specific portions of the screenplay 100 may be formatted (e.g., capitalization, indentation from left margin, etc.) in ways that distinguish sections of the screenplay 100 and from each other (e.g., sluglines 102 from sections of dialogue 106). If the screenplay 100 does not contain machine-readable text, text of the screenplay 100 may be converted to machine-readable form by optical character recognition.

At 404, the text and the formatting of the screenplay 100 are analyzed to extract storyboard content from the screenplay 100. The analysis may be performed by the screenplay analysis module 302. The storyboard content may include such things as character descriptions, sections of dialogue 106, scene descriptions, and the like. A context of a portion of text from the screenplay 100 may be ascertained by the formatting of the screenplay 100. For example, a short passage of text between two parentheses may be identified as a parenthetical 110 that expresses emotion or indicates a brief portion of action. The meaning of the text may be ascertained by text analytics implemented by the text analytics module 304 and the meaning may be further refined by consideration of the context. For example, the context may be used to disambiguate between multiple meanings identified through text analytics. The analysis may also include identifying a slugline 102 that includes a scene description. The slugline 102 may be identified by the size of the margins surrounding the slugline 102 and by the capitalization of the text in the slugline 102.

The character descriptions may include gender, physical characteristics, and facial expressions. For example, a description that "Jack sees a tall, smiling woman" provides information about one of the other characters in the scene with Jack. Furthermore, the scene description may describe a background image 118 and or a camera technique. For example, the scene description may indicate a hillside and that may provide information for a background selection module 312 to identify a background image 118 appropriate for the scene.

At 406, a storyboard 112 is compiled. The storyboard 112 may be compiled by the storyboard generation module 328. A storyboard 112 may be based on the storyboard content such as the character description, the dialogue 106, and the scene description. The storyboard 112 may be compiled by selecting a character image 116 based on the character description and including the character image 116 in the storyboard 112. Moreover, audio based on the dialogue 106 may be included in the storyboard 112 as an audio track. The audio may be obtained from the text-to-speech module 316 or from a voice recording 216 of a person reading the lines of dialogue 106.

Figure 5:
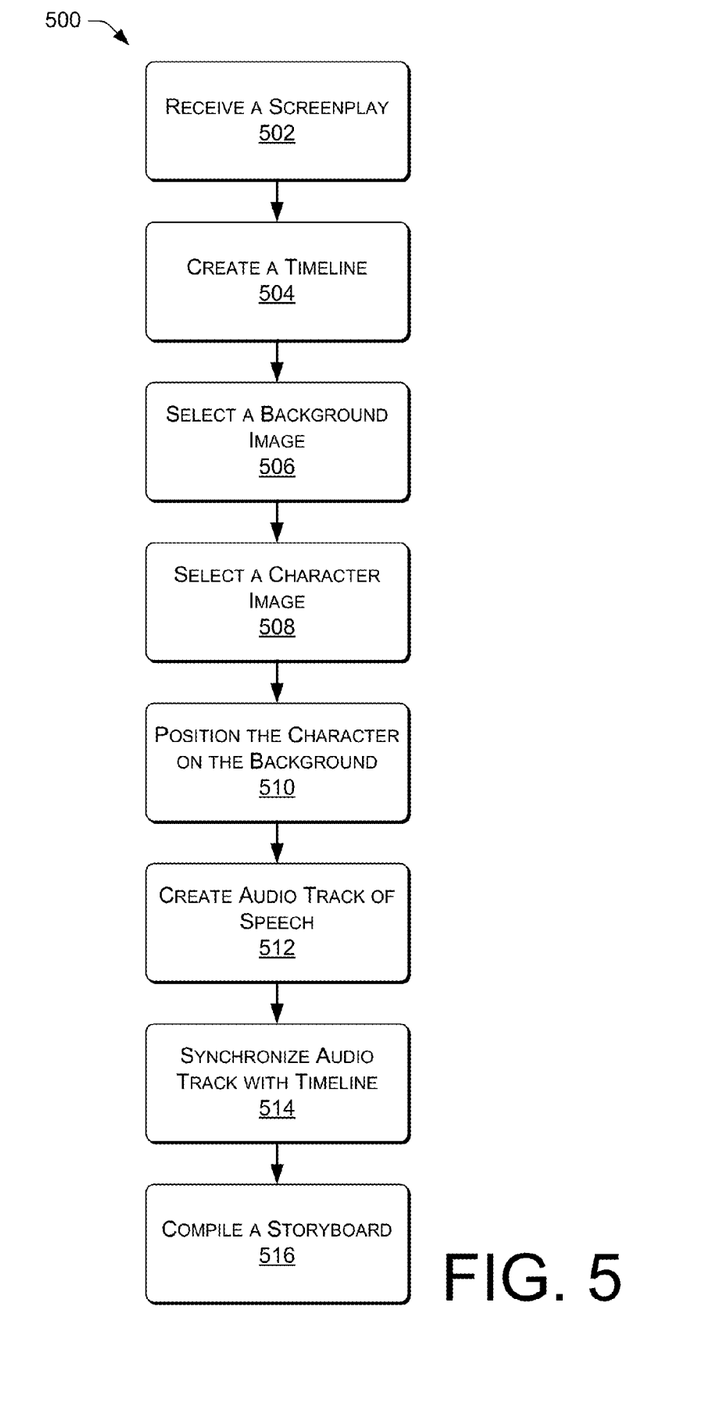

FIG. 5 illustrates a process 500 for generating a storyboard 112 with a synchronized audio track from a screenplay 100. At 502, a screenplay 100 is received from a first user (e.g., user 202(1)). The screenplay 100 may be contributed by the first user to a project 214 to allow multiple users to participate in generating a storyboard 112 from the screenplay 100. The screenplay 100 may include one or more pages of text with sluglines 102 character descriptions, character dialogue 106, and descriptions of action 104.

At 504, a timeline is created that includes approximately 1 minute of time for each page of the screenplay 100. The timeline may be created by the timeline generation module 320. The timeline may also include scenes that begin at time points which correspond to locations of the sluglines 102 on the pages of the screenplay 100. For example, a slugline 102 that begins in the middle of the third page of the screenplay 100 will correspond to a scene that starts at about 2 minutes and 30 seconds along the timeline.

At 506, a background image 118 is selected for the storyboard 112. The background image 118 may be selected by the background selection module 312 or by manual input from a user (e.g., user 102(n)). The specific background image 118 selected for a scene (e.g., a hillside) may be based on the text contained in the slugline 102 that indicates the beginning of the scene. Selection of a background image 118 may be repeated (e.g., for other scenes) until some or all background images 118 for the storyboard 112 are selected.

At 508, a character image 116 for one of the characters in the screenplay 100 is selected. The character image 116 may be selected by the character image generation module 306 or by a user. In some implementations, the character image may include a facial expression. The image selected for the character image 116 (e.g., out of the multiple character images available in the character image library 220) may be based on descriptions of the character and character dialogue 106. Selection of a character image 116 may be repeated (e.g., for other characters in the screenplay 100) to select other character images 116 for the storyboard 112.

At 510, the character image 116 is positioned in front of the background image 118. The positioning of the character image 116 in front of the background 118 may be based on a description of action 104 from the screenplay 100. For example, if a description of action 104 indicates that the character walks along a hillside, the character image 116 may be placed on the boundary between the hillside and the sky. Placement of the character image 116 relative to the background image 118 may be implemented by the storyboard generation module 328. Placement may be repeated for each character image 116 that appears before a particular background image 118 and for other character images 116 and respective background images 118 that appear in other scenes.

At 512, one or more audio tracks of speech corresponding to the character dialogue 106 are created. The audio tracks of speech may be created from recordings of a user reading lines of dialogue 216 or synthesized by the text-to-speech module 316. The speech for each separate character may be implemented as a separate audio track or there may be a single audio track that contains speech for all the characters from the screenplay 100. Creation of the audio track representing speech may be repeated for other lines of dialogue 116 from the screenplay 100.

At 514, the audio tracks of speech are synchronized with the timeline created at 504. The synchronization may be performed by the synchronization module 326. In some implementations, the relative length of the character dialogue 106 and the descriptions of action 104 may be the basis for the synchronization. For example, the relative length in numbers of lines or in fractions of a page may represent an amount of time (i.e., assuming one page of the screenplay 100 is assigned one minute of time) and the relative lengths of the dialogue passages 106 and the action passages 104 indicate how to divide the amount of time represented by a page of the screenplay 100. When multiple audio tracks of speech exist, the synchronization may be repeated until some or all of the audio tracks of speech are synchronized with the timeline created at 504.

At 516, a storyboard 112 is compiled. The storyboard 112 may be compiled by the storyboard generation module 328. The elements and ordering of the storyboard 112 may be based on the background image 118 selected at 506, the character image 116 selected at 508, the timeline created at 504, and/or the audio tracks of speech created at 512. Thus, the finished storyboard 112 has a series of visual images accompanied by audio that is synchronized according to a timeline. Creation of the storyboard 112 may be an iterative process performed at any one of multiple levels of granularity (e.g., scene, shot, etc.) by repeating all or part of process 500 multiple times for separate portions of the storyboard 112.

Figure 6:
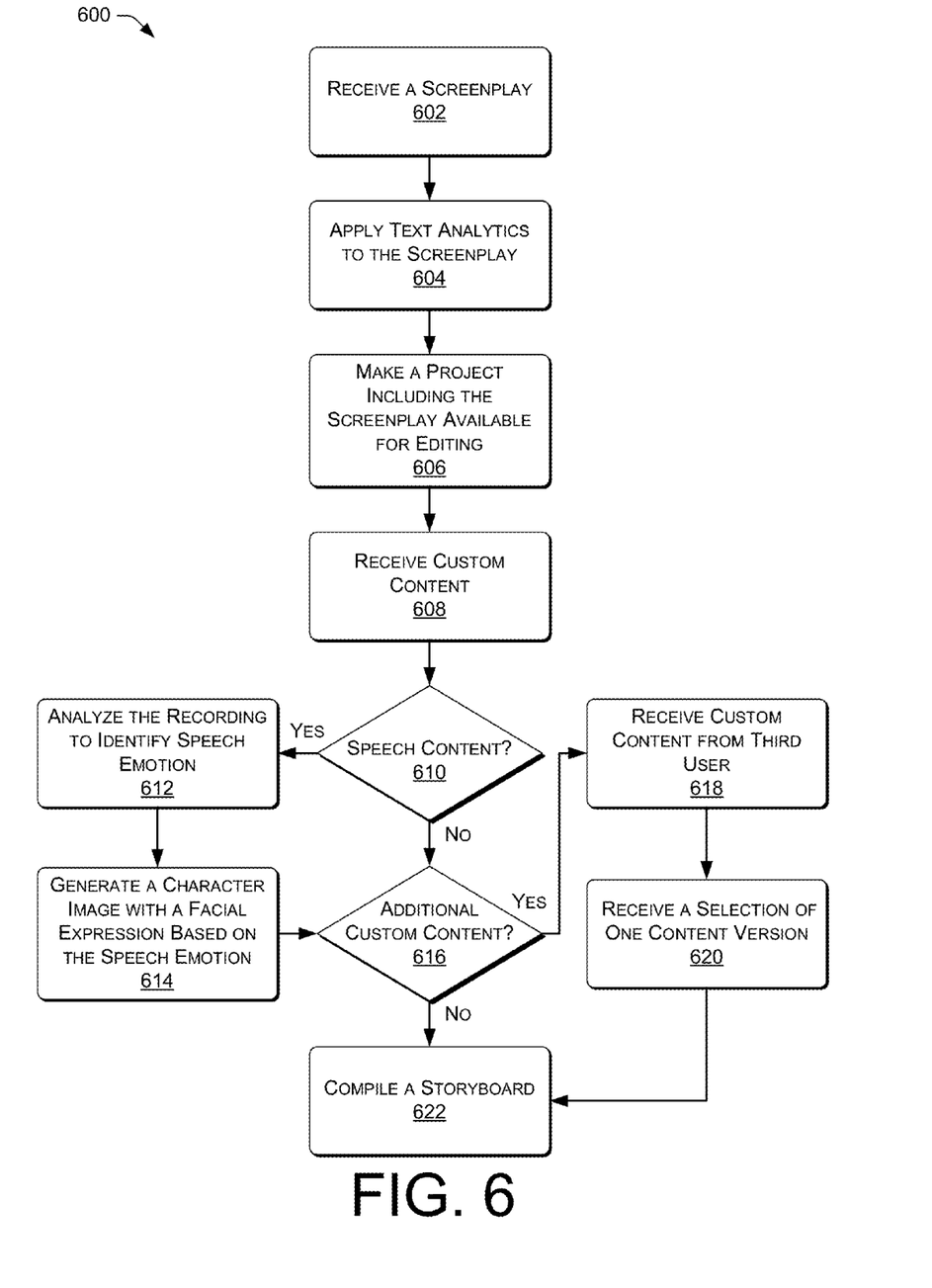

FIG. 6 illustrates a process 600 for generating a storyboard 112 from a screenplay 100 by collaboration among multiple users. At 602, the screenplay 100 is received from a first user (e.g., user 202(1)). The first user may be an author of the screenplay 100. In some implementations, the first user may upload the screenplay 100 to the collection of shared computing resources 208 so that the screenplay 100 is available to multiple other users.

At 604, text analytics are applied to analyze the screenplay 100. The text analytics may be applied by the text analytics module 304. The text analytics may identify a character in the screenplay 100 (e.g., by name, by enumerating the character in a cast list, etc.), a section of dialogue 106, and/or a scene (e.g., as identified by a slugline 102) in the screenplay. The text analytics may also identify other elements in the screenplay 100 such as sections of action 104, parentheticals 110, and the like.

At 606, a project 214 that includes the screenplay 100 is made available for editing. The project 214 may be available for editing by the first user who provided the screenplay 100 as well as one or more other users (e.g., users 202(2)-202(n)). Editing the project 214 may include changing existing content in the project 214 as well as adding or removing content from the project 214.

At 608, custom content for the project 214 is received. The custom content may be received by the shared computing resources 208 or by another system managing the project 214. The custom content may be received from the first user who provided the screenplay 100 or from a second user different from the first user. The custom content may include any content that can be used in creation of the storyboard 112 from the screenplay 100 such as a reading of lines of the dialogue 216 in the screenplay 100, a character image 116, a background image 118, and the like.

At 610, it is determined if the custom content is a recording (s) of speech content of someone reading lines of the dialogue 216. If it is speech content, process 600 proceeds along the "yes" path to 612 for additional processing specific to speech content. If it is a type of custom content other than speech content (e.g., a custom character image 116), process 600 proceeds along the "no" path to 616.

At 612, the recording(s) of the readings of the lines of dialogue may be analyzed to identify speech emotion. This analysis may be provided by the speech emotion analysis module 308. The analysis may identify an emotion (e.g., happy, sad, etc.) represented by how the reader (e.g., voice talent) reads the lines of dialogue 106.

At 614, the emotion identified at 612 may be used to generate a character image 116 with a facial expression based on the speech emotion. The process 600 may proceed to decision point 616 from 614, or directly from the decision 610 following the "no" path from the decision 610.

At 616, it is determined if additional custom content was received from a third user different from either the first user or the second user. If there is no additional custom content, process 600 proceeds along the "no" path to 622 where the storyboard 112 is compiled. The storyboard 112 may be generated by incorporating the custom content received at 608. The storyboard generation module 328 may function in generating the storyboard 112.

If there is additional custom content from a third user, process 600 proceeds along the "yes" path from 616 to 618. At 618, custom content is received from a third user different from either the first user or the second user. The custom content received from the third user at 618 may be a recording of the third user reading the same lines of dialogue 216 as were read and received from the second user at 608. Although readings of dialogue 216 are discussed in this example, any type of custom content may be received from two (or more) different users. Since both the second user and the third user (e.g., two different voice talents) made recordings of their respective readings of the lines of dialogue 216, the project 214 contains two different recordings of the same, or similar, lines of dialogue 216.

At 620, a selection of one of the multiple versions of the same or similar content is received. For example, the choice may be between multiple recordings of the same lines of dialogue 216, between multiple background images 118, between multiple character images 116, etc. The selection may be provided by one of the users identified above (i.e., first, second, or third) or by another user via a user interface. The user interface may be generated by the storyboard editing module 330 and provide a mechanism to consume the storyboard 112 with the alternative readings of the lines of dialogue 216 so that both alternatives may be evaluated in context.

Process 600 may then proceed to 622 where the storyboard 112 is compiled with the custom content received at 608, any character facial images generated at 614, if applicable, and any custom content from a third user received at 618, also if applicable.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method of generating a storyboard from a screenplay, the method comprising:

receiving, by one or more computing devices, the screenplay from a first user, the screenplay comprising one or more pages of text that include one or more sluglines, a character dialogue, and one or more screenplay descriptions, the one or more screenplay descriptions corresponding to a description of a character, scene or action;

creating, by at least one of the one or more computing devices, a timeline having a predetermined amount of time associated with each page of the screenplay, the timeline comprising one or more scenes, each scene beginning at a time point corresponding to a location of one of the one or more sluglines on the one or more pages of the screenplay;

selecting, by at least one of the one or more computing devices, a background image for one of the one or more scenes based at least in part on text contained in a slugline indicating a beginning of the scene;

associating, by at least one of the one or more computing devices, a facial expression from a plurality of facial expressions to at least one character based at least in part on the one or more screenplay descriptions or the character dialogue, wherein each facial expression of the plurality of facial expressions comprises a predetermined, anatomically-based facial appearance;

associating, by at least one of the one or more computing devices, the facial expression with a character image for the at least one character based at least in part on the one or more screenplay descriptions or the character dialogue;

positioning, by at least one of the one or more computing devices, the character image in front of the background image;

creating, by at least one of the one or more computing devices, one or more audio tracks comprising speech corresponding to the character dialogue;

synchronizing, by at least one of the one or more computing devices, the one or more audio tracks with the timeline based at least in part on a relative length in fractions of the pages of the character dialogue; and compiling, by at least one of the one or more computing devices, the storyboard based at least in part on the background image, the character image, the timeline, and the one or more audio tracks.

2. The method of claim 1, wherein the one or more screenplay descriptions comprise at least one of a sentiment, a mood or an emotion of a character.

3. The method of claim 1, wherein the background image is based at least in part on one of the one or more screenplay descriptions.

4. A computer-implemented method comprising:

receiving, by one or more computing devices, a screenplay comprising text and formatting, the screenplay having at least one or more screenplay descriptions that correspond to a description of a character, scene or action;

analyzing, by at least one of the one or more computing devices, the text and the formatting of the screenplay to extract storyboard content that includes identifying at least one character, and a character dialogue;

determining, by at least one of the one or more computing devices, a facial expression of a plurality of facial expressions of the at least one character based at least in part on the screenplay description or the character dialogue, wherein the facial expression comprises a predetermined, anatomically-based facial appearance;

associating, by at least one of the one or more computing devices, the facial expression with a character image of the at least one character based at least in part on the screenplay description or the character dialogue; and compiling, by at least one of the one or more computing devices, a storyboard based at least in part on the storyboard content.

5. The method of claim 4, wherein analyzing the text and the formatting comprises ascertaining a context based at least in part on the formatting and ascertaining a meaning of the text based at least in part on text analytics and the context.

6. The method of claim 4, wherein the analyzing comprises identifying a slugline that includes the scene description, wherein the slugline is identified at least in part by margins surrounding the slugline and capitalization of text in the slugline.

7. The method of claim 4, wherein the description of the character comprises a gender or a physical characteristic.

8. The method of claim 4, wherein the storyboard content further includes a scene description that comprises a scene location, and wherein the generating the storyboard includes placing a background image that corresponds to the scene location.

9. The method of claim 8, wherein the scene description comprises a camera technique.

10. The method of claim 4, wherein generating the storyboard further comprises selecting, for inclusion in the storyboard, audio based at least in part on the character dialogue.

11. The method of claim 10, wherein the audio comprises synthesized speech generated by text-to-speech conversion of text of the character dialogue.

12. A computer-readable storage medium having stored therein instructions, which, when executed by a processor, cause a computing device to perform acts comprising:
receiving a screenplay, the screenplay having at least one or more screenplay descriptions that correspond to a description of a character, scene or action;
applying text analytics to identify a character, character dialogue, and a scene in the screenplay;
performing a sentiment analysis of the one or more screenplay descriptions to associate the character with at least one of a sentiment, a mood, or an emotion, the sentiment analysis based at least in part on the text analytics;
determining a facial expression of the character from a plurality of facial expressions based at least in part on the sentiment analysis, wherein each facial expression of the plurality of facial expressions comprises a predetermined, anatomically-based facial appearance;
associating the facial expression with the character;
generating a timeline for the screenplay wherein a time range of the timeline is selected based at least in part on a length of the screenplay;
electronically publishing a project comprising the screenplay;
receiving custom content for the project; and
generating a storyboard based at least in part on the character, the dialogue, the scene, the timeline, and the custom content.

13. The medium of claim 12, wherein the custom content comprises a recording of lines of the character dialogue.

14. The medium of claim 13, wherein the acts further comprise: making the project comprising the screenplay available for editing; and receiving custom content for the project, wherein the custom content comprises another recording of the lines of the character dialogue such that the project comprises two different recordings of the lines of the character dialogue.

15. The medium of claim 14, wherein the acts further comprise: presenting a user interface configured to receive a selection between the two different recordings; and generating the storyboard based at least in part on the selected one of the two different recordings.

16. A computing device comprising:
one or more processors; and a memory coupled to the one or more processors, the memory comprising:
a screenplay analysis module configured to identify, in a screenplay having one or more pages, sections of dialogue, sections of action, and relative locations of the sections of dialogue and the sections of action within the one or more pages;
a timeline generation module configured to generate a timeline for the screenplay based at least in part on a number of pages in the screenplay;
a synchronization module configured to map audio corresponding to the sections of dialogue to the timeline based at least in part on the relative locations of the sections of dialogue and the sections of action within the one or more pages;
a character image generation module configured to:
analyze audio that corresponds to a section of dialogue to identify a mood, sentiment, or emotion of at least one character;
determine a facial expression of a plurality of facial expressions of the at least one character based at least in part on the audio analysis, wherein the facial expression comprises a predetermined, anatomically-based facial appearance; and
associate the facial expression with a character image of the at least one character for inclusion in the storyboard; and
a storyboard generation module configured to generate a storyboard based at least in part on the timeline, the storyboard comprising an audio track based at least in part on the section of dialogue mapped to the timeline.

17. The computing device of claim 16, wherein the timeline generation module allocates an average of one minute of time in the timeline for one page of the screenplay.

18. The computing device of claim 16, wherein the timeline generation module divides the timeline into scenes based at least in part on one or more sluglines in the screenplay.

19. The computing device of claim 18, wherein the timeline generation module divides the scenes into camera shots based at least in part on an analysis of a slugline at a beginning of a scene and at least one of a section of dialogue or a section of action in the scene.

20. The computing device of claim 16, wherein the character image is further based at least in part on textual analysis of sections of dialogue associated with the character.

21. The computing device of claim 16, wherein the memory further comprises a background selection module configured to select a background for the storyboard based at least in part on textual analysis of a slugline.

22. The computing device of claim 16, wherein the audio analysis comprises segmenting a speech sample into voiced and unvoiced sounds, words or syllables to allow a quantitative description of homogenous parts of the audio.

23. The computer device of claim 16, wherein the memory further comprises a screenplay analysis module configured to perform a disambiguation analysis of a section of dialogue, the disambiguation analysis determining at least one interpretation of multiple possible interpretations of the section of dialogue.

* * * * *